United States Patent Office 3,564,474
Patented Feb. 16, 1971

3,564,474
ELECTRICALLY HEATABLE ELEMENTS
Jack Graham Firth, Burncross, near Sheffield, and Alfred Guest, Rotherham, England, assignors to National Research Development Corporation, London, England
Filed June 4, 1968, Ser. No. 734,474
Int. Cl. H01c 7/08; G01n 31/00
U.S. Cl. 338—25                                3 Claims

ABSTRACT OF THE DISCLOSURE

An electrically heatable element with a filament embedded in a fused ceramic material having a softening point not greater than 1500° C. has a catalytic material deposited on the outer surface of the fused ceramic.

---

Electrically heatable filaments, particularly the helical coil type are used in connection with the detection of combustible gases for which purpose it is usual to employ a pair of such filaments constituting detecting and compensating elements arranged in a Wheatstone bridge circuit. Combustible gases may be catalytically oxidised utilising a catalyst situated at the surface of the detecting filament, thereby raising the temperature of the latter and therefore affecting its resistance so that the normal balance of a bridge circuit is upset. The out of balance current may be utilised by a suitable means to indicate the detection and/or the proportion of the combustible gas in the sample under test.

Filaments in the aforementioned apparatus have been used exposed directly to the gas sample. These filaments are often heated to temperatures of 900° C. or more and, at this temperature, metal evaporates from the surface of the wire. Thus the resistance of the wire is continually increasing especially during the oxidation of combustible gases. This continuing increase in resistance, which is greater in the detecting filament than the compensating filament, effects a change in the zero reading of the bridge circuit which must therefore be adjusted at frequent intervals.

It has been suggested that the filament be surrounded by a refractory material, the outer coating of which is impregnated with a catalyst. Such filaments when exposed to certain gases, as for instance hydrocarbons, weaken mechanically and may disintegrate. It is thought that this disintegration and weakening of the refractory material may be due to the deposition in the pores of the material of carbon obtained by the catalytic cracking of the hydrocarbons. This effect is enhanced by the diffusion of the catalyst into the pores of the refractory.

The object of the invention is to provide an electrically heatable element, particularly for use in the detection of combustible gases in air, which will have a longer working life than those used hitherto and which will avoid the deposition of carbon in the pores of the envelope.

In accordance with the invention, a filament is embedded in a fused ceramic material of softening point not greater than 1500° C. and a catalytic material is deposited on the outer surface of the fused ceramic material. The smooth surface of the fused ceramic substantially prevents any penetration by the catalyst or the gaseous constituents of the sample to be taken.

The material in which is embedded the filament may be refractory throughout and sealed against penetration into it of the gas and catalyst by fusion of a layer of the ceramic material upon the outer surface to form an impermeable layer upon which is carried the catalyst, or alternatively the said material, instead of being refractory throughout, may be made from an intimate mixture of refractory and ceramic the whole being heated to fuse the ceramic material thereby to produce an impermeable mass for receiving the catalyst. In a further embodiment of the invention, the ceramic material may consist in whole or in part of an inorganic glass.

The ceramic materials which can be used in these ways have an advantage in that they render the element much more stable in high concentrations of combustible gases, so that it may be used indefinitely in any concentration of such gas. It is to be understood that the ceramic material must have a softening point well below the melting point of the wire so that it can be applied without damaging the wire.

It should here be stated that the ceramics used should have softening points as far as possible above the temperature the element is likely to reach in operation, i.e. greater than 850° C. to avoid bubble formation, deformation under gravity and attack on or dissolution of the catalyst. These ceramics also should not contain a material, e.g. sodium, which is likely to diffuse into the catalyst and interfere with its reactivity, and preferably, in order to avoid reaction on the compensating element, they should not themselves be catalytically active in high concentrations of combustible gases. Furthermore, the ceramics should not attack the filament in cases where they are likely to come into contact therewith at the temperature of fusion.

One material which has been found suitable for effecting the sealing or providing the layer is a glass with a softening point of 920° C. and composition 54.3% $SiO_2$, 21.0% $Al_2O_3$, 8.0% $B_2O_3$, 13.5% CaO, 3.1% BaO. This may be applied as a dispersion of the finely ground glass in twice its weight of glycerol and heating to 1100° C. by passing an electric current through the filament. The catalyst which is applied to the outer surface of the ceramic body consists of at least one metal from the platinum group, as for example platinum and palladium. It may be applied as a solution or dispersion of a compound or compounds, removing the liquid and activating the catalyst by heating in air or, if necessary, in another gas. One example of a catalyst solution is a mixture of 15 gms. of thorium nitrate in 10 mls. of water and a solution of 2.56 gms. of ammonium chloropalladite in 10 mls. of 0.33 N nitric acid.

In the case where an impermeable layer is provided upon the refractory this may in some instances be made separately from the element. Such layer may be in the form of a sheath which may, for example, be made of a material having a higher melting point than the filament.

In order that the invention may be clearly understood and readily carried into effect, examples of electrically heatable elements in accordance therewith will now be described with reference to the accompanying drawings of which:

Figure 1:
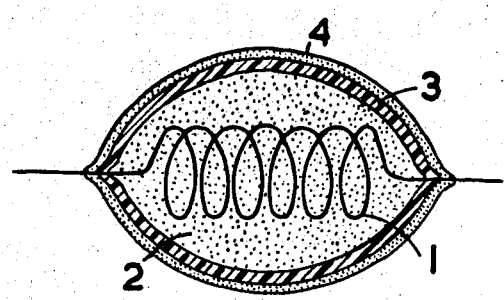
FIG. 1 is a sectional view showing one form of the element.

In the construction shown in FIG. 1, a six-turn coil 1 of $10^{-3}$ inch diameter platinum wire is wound at a pitch of $2 \times 10^{-3}$ inches and a radius of $6 \times 10^{-3}$ inches and coated with alumina 2 to form a bead in the manner described in the complete specification of British Pat. No. 892,530. A slurry of a ceramic powder in glycerol is then applied by a dropper and dried by passing an electric current through the coil. The current is then increased until the temperature is high enough for the ceramic to fuse. The element is then cooled to leave an impermeable layer 3 of fused ceramic upon which the catalyst 4 is deposited.

Figure 2:
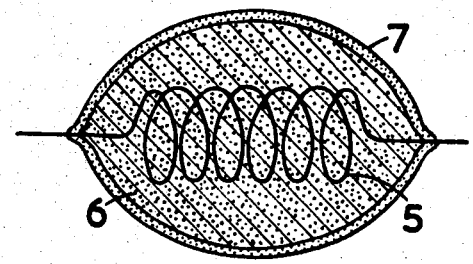
FIG. 2 is a similar view showing an alternative form.

In the construction shown in FIG. 2, a six-turn coil 5, similar the coil 1, has applied to it by a dropper a slurry of a refractory material, e.g. alumina, and a ceramic material in glycerol which is dried by passing an electric current through the coil. Successive layers of the mixture are then added, each being dried in a similar manner, until the coil is completely embedded. The current is then increased until the ceramic fuses and produces an impermeable bead 6 in which the coil 5 is embedded. The catalyst layer 7 is then applied.

In a further alternative construction the slurry is made entirely of ceramic material.

The ceramic material and slurry which has hereinbefore been described, is suitable for use in the three constructions of electrically heatable elements just described. A suitable catalyst has also been described. A further catalyst which has been found particularly stable when used on the elements forming the subject of the present invention may be applied by using the two following solutions, namely:

(A) 0.745 gm. of ammonium chloropalladite in 10 mls. of 0.33 N nitric acid.
(B) 0.745 gm. of ammonium chloropalladite in 10 mls. of 0.08 N nitric acid and 3.75 gms. of thorium nitrate in 10 mls. of water.

A drop of solution (A) may be applied to the element and slowly dried by passing a small current through the coil to give a uniform deposit of solid. The temperature may then be slowly increased to 700° C. by increasing the current through the coil to give a uniform layer of palladium. After this, a drop of catalyst solution (B) may be applied to the element in the manner just described and this latter application repeated four times to produce the layer of catalyst material.

We claim:
1. An electrically heatable element comprising a metal filament, a gas impermeable material enveloping said metal filament and a coating of a catalytic materil on the outer surfce of said gas impermeable material, wherein the gas impermeable material comprises at least in part a glass having a softening point below 1500° C.
2. An electrically heatable element according to claim 1 wherein the gas impermeable material is a glass.
3. An electrically heatable element according to claim 1 wherein the gas impermeable material comprises an intimate mixture of a porous refractory material and a glass which is fused to provide a gas impermeable structure.

References Cited
UNITED STATES PATENTS 3,200,011   8/1965   Baker _____ 73—27X RICHARD A. FARLEY, Primary Examiner
T. H. TUBBESING, Assistant Examiner U.S. Cl. X.R.

23—254; 73—27; 117—217; 338—34